United States Patent [19]

Iwata et al.

[11] Patent Number: 4,671,917
[45] Date of Patent: Jun. 9, 1987

[54] METHOD AND APPARATUS FOR COOLING MOLTEN OXIDES

[75] Inventors: Akira Iwata; Masahiro Tamamaki; Genji Tanaka; Masaaki Taniguchi; Kouji Tsuda, all of Sakai, Japan

[73] Assignee: Japan Abrasive Co., Ltd., Osaka, Japan

[21] Appl. No.: 761,004

[22] Filed: Jul. 30, 1985

[51] Int. Cl.[4] .............................. B01D 9/00
[52] U.S. Cl. ............................. 264/332; 164/443; 241/3; 249/66 R; 249/79; 249/137; 249/154; 264/140; 264/312; 264/334; 425/438; 432/224
[58] Field of Search ............ 264/8, 312, 140, 299, 264/28, 212, 332, 334; 249/79, 66 R, 137, 154; 164/443, 444; 266/109, 137, 166; 425/6, 442; 241/3, 23, 65, 67; 432/225, 4, 224

[56] References Cited

U.S. PATENT DOCUMENTS

| 1,203,327 | 10/1916 | Harding | 264/312 |
| 1,722,555 | 7/1929 | Brenner | 249/79 |
| 4,405,545 | 9/1983 | Septier et al. | 264/332 |
| 4,412,580 | 11/1983 | Chadwick et al. | 164/443 |

FOREIGN PATENT DOCUMENTS 13323  5/1978  Japan ........................ 264/140

Primary Examiner—James Lowe
Attorney, Agent, or Firm—Koda and Androlia

[57] ABSTRACT

Molten oxide of grinding material, refractory material, etc., being poured into a circular casting space formed between coaxially arranged inner and outer cylinders and cooled by the water contained in the inner cylinder. Thus, the molten oxide is cooled radially from the center of the inner cylinder and solidified. The outer cylinder includes two segments which separate from each other for facilitating putting the molten oxide into the casting space and taking the resulting solidified product out of the casting space.

2 Claims, 2 Drawing Figures

METHOD AND APPARATUS FOR COOLING MOLTEN OXIDES

BACKGROUND OF THE INVENTION

1. Field of the Invention

The present invention relates to a method for cooling oxide melts of grinding material, fire resistant material, etc. and to an apparatus for practicing such method.

2. Prior Art

Several conventional method for manufacturing molten oxides applied to zirconia-aluminous abrasives are disclosed in patents.

One of the methods is to pour the molten oxide into a carbon steel bowl (2½" in diameter) as disclosed in Japanese Patent Publication No. 1975-16556. Another method is to solidify the molten oxide by pouring it into a void space between parallel plates having a gap (12.7—1.6 m/m) as disclosed in Japanese Patent Publication No. 1977-39193. Japanese Patent Publication No. 1982-36299 discloses a method wherein a melt of grinding material is poured into a melt of metal that has melting point below 300° C. and a boiling point about 2000° C. In addition, equipment along this line is provided in Japanese Patent Publication No. 1983-14816, which is an applied model of the method of Japanese Patent Publication No. 1977-39113. (All of them are provided by Norton Company).

In general, a method for producing molten oxides of grinding material or refractory material, etc. with zirconia dispersed homogenously in the resultant product requires as important conditions, appropriate control of the cooling rate, proper selection of the cooling direction, and the facillitation of detachment as well as grinding of the solidified products from the melt. In light of this, as is pointed out in Japanese Patent Application Laid-Open No. 1979-62111 (the Carborundum Company), the cooling process provided by Japanese Patent Publication No. 1975-16556 is unsatisfactory in the following points. Since the cooling direction is three-dimensional, the orientation of produced crystals is irregular. Also, since the passage to be filled is turned and bent, it is difficult for it to be filled with the molten oxide. Further, since further cooling is necessary for detachment of the solidified product of the melt, it takes more time and makes this process far less desirable in view of production efficiency. Also, the cooling rate differs greatly between the center area and the peripheral area of the solidified product. As a result, it is not feasible to obtain aluminous grinding material with zirconia dispersed evenly in it.

The method disclosed in Japanese Patent Publication No. 1977-39193 is advantageous in that since unidirectional solidification is used for cooling the molten oxide and also the cooling rate is sufficiently controlled in this method, it offers an aluminous abrasive containing homogenously dispersed zirconia. However, on the other hand, there still remain problems in this method in terms of manufacturing. Particularly, detachment of the solidified product from the melt from the parallel plates is difficult and dangerous. Furthermore, the solidified product from the melt thus obtained is flaky in form having a large area. Further, in view of the high degree of toughness that is characteristic of zirconia-alumina grinding material, the product is not suitable for coarse impact crushing carried out by the use of an impeller breaker or jaw crusher. Also, even in the apparatus provided in the above method by Japanese Patent Publication No. 1983-14186, while most of the problems are solved, the remnants of the problems are yet to be solved regarding the lack of flexibility in using the apparatus and also the need for large amount of investment capital.

On the other hand, with the method proposed by Japanese Patent Publication No. 1982-36299, an aluminous abrasive containing homogeneously dispersed zirconia can be obtained. However, separation of the abrasive grain from the metal is not easy because a metal melt bath is used for cooling. Also, in the method disclosed in Japanese Patent Publication No. 1979-62111, satisfactory results are not obtained since a large capacity is required for pouring the molten oxide in order to obtain aluminous grinding material containing homogenously dispersed zirconia by sufficiently controlling the cooling rate. Besides, detachment of the solidified product from the melt is quite difficult.

SUMMARY OF THE INVENTION

Based upon a study of the foregoing defective points and problems in the prior art, it is the primary object of the present invention to provide a process for rapidly cooling molten oxides by using an apparatus completely different in nature from those in the prior art.

It is the general object of the present invention to provide a cooling system as well as cooling apparatus for molten oxides.

It is another object of the present invention to provide a cooling system for molten oxides that is well-controlled with respect to the cooling rate as well as the cooling direction.

It is still another object of the present invention to provide a cooling method and apparatus therefor, which is capable of facilitating detachment and crushing of the solidified product resulting from the melt.

It is a further object of the present invention to provide a cooling apparatus for molten oxides which is highly versitle in its application and helps lower investment capital.

The above mentioned and other objects of the present invention are accomplished by a unique cooling system invention including a casting space formed between a pair of cooling surfaces which are curved and facing each other, wherein the oxide melt of grinding material or fire resistant material is poured and the molten oxide is quickly cooled and solidified by being cooled in radial form from an imaginary cooling center point.

DETAILED DESCRIPTION OF THE INVENTION

Hereunder a detailed description of the present invention will be given with reference to the accompanying drawings.

In a cooling apparatus provided by this invention, the molten oxide is poured into a casting space between curved cooling surfaces. As a result, the molten oxide can be solidified nearly unidirectionally. Also, a sufficient cooling rate and appropriate cooling direction can be selected for the molten oxide. At the same time, the fragile area at the center of the solidified product from the melt, that has been liable to be formed due to the unidirectional cooling by complete fixation with parallel plates, is reduced in size.

In the conventional cooling system, when the oxide melt is cooled in the gap between parallel plates and begins to solidify, freezing starts from the areas which are in contact with the cooling surfaces, and solidification proceeds in the direction towards the center. Therefore, a fragile area is formed near the center of the solidified material, making it necessary to take great care in order to obtain a desired grain size with maximum yield.

Figure 2:
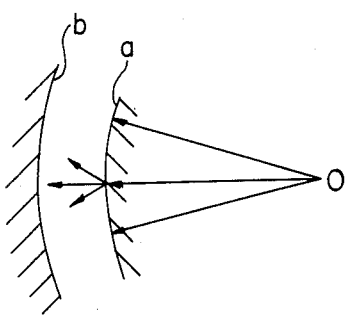
FIG. 2 is a schematic diagram showing the principles of the present invention.

Unlike the foregoing system used conventionally, according to the present invention, solidification is not effected in the form of complete unidirectional hardening. Particulary, as shown in FIG. 2, cooling starts radially from a virtual cooling center point O and spreads out in three-dimensional radial form from the interal cooling surface a toward the external cooling surface b, thereby taking a type of unidirectional solidification process combined with three-dimensional cooling orientation. Consequently, the cooling rate and cooling direction can be controlled sufficiently for obtaining aluminous materials or other oxide materials (mullite, spinel, etc.) with homogeneously dispersed zirconia contained therein.

Furthermore, in this invention, the solidification products obtained from the melts are curved in form. This curved form is highly advantageous in facilitating the initial coarse crushing of aluminous or other oxide materials (mullite, spinel, etc.) containing homogeneously dispersed zirconia, which have a high degree of toughness as well as strength and, accordingly, are considered difficult to crush. Therefore, the solidification products obtained from melts in this invention are suitable for impact crushing with an impeller breaker and jaw crusher.

In addition, with respect to application flexibility, aluminous or other oxide compounds (mullite, spinel, etc.) with zirconia dispersed homogeneously therein, which have characteristics specified according to necessity, can be produced by adjusting the casting gap. Consequently, the present invention contributes to a substantial reduction in investment capital for making the equipment.

An apparatus for applying the above mentioned cooling system is constructed as follows: An inner cylinder and an outer cylinder are coaxially disposed with a casting gap interposed in between. The inner cylinder is operated to rotate from outside and contains a cooling water passage. The outer cylinder is a two-part structure composed of right and left segments so that the outer cylinder can be opened and closed.

Figure 1:
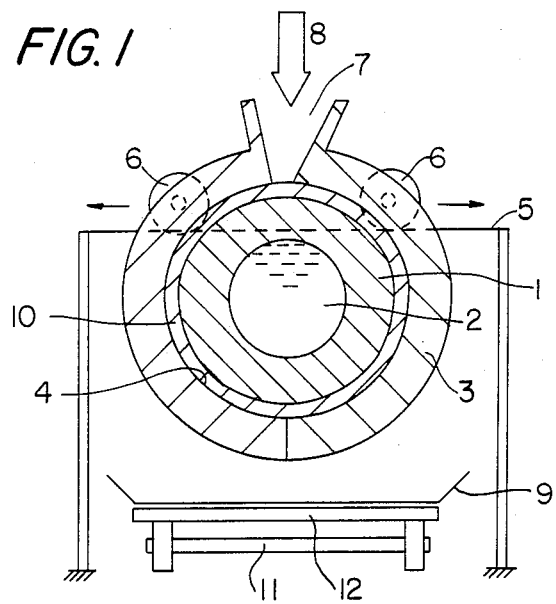
FIG. 1 is a schematic front view of cooling equipment as an embodiment of the present invention.

FIG. 1 shows an example of a cooling apparatus for molten oxide which is mounted on a movable base table 12 having a wheel 11. Numeral 1 is an inner cylinder with a cooling water passage 2 provided inside of it. This inner cylinder 1 can be rotated when operated from outside at both of its ends in either a clockwise or counter-clockwise direction.

An outer cylinder 3 is provided coaxially with the foregoing inner cylinder 1, with a casting gap 4 interposed in between. The outer cylinder 3 is composed of right and left segments so that they can be separated from each other and joined together by an opening and closing means. In this embodiment, the opening and closing means is created by providing the respective segments with travelling wheels 6 which run along a horizontal track 5 provided outside.

Numeral 7 is an inlet for molten oxide 8, and 9 is a receiving pan for collecting the solidified product obtained by solidifying the foregoing molten oxide 8. The above mentioned inner cylinder 1 and outer cylinder 3 are made primarily of metal, steel or graphite.

In operation, the outer cylinder 3 in a fully opened state, is closed by rotating the travelling wheels 6. Cooling water is fed into the water passage 2 from outside. Then, the molten oxide 8 is poured into the casting gap 4 through the inlet 7 until it fills the gap so that the molten oxide 8 is cooled and solidified. Thereafter, the external cylinder 3 is opened by moving the segments to the right and left, respectively. Then, the solidified product 10 from the melt is shaken down onto the receiving pan 9 by forcibly rotating the inner cylinder 1. The solidified product 10 from the melt thus collected by the pan 9 is carried together with the base table 12 to a crusher. By repeating the foregoing operation, mass-production of the solidified product can be carried out very easily.

In the embodiment described above, the means for opening and closing the external cylinder 3 include travelling wheels 6 which run along the outside track 5. However, this means which opens and closes the outer cylinder is not limited to the travelling wheels 6. Any means which opens and closes the outer cylinder 3 by separating the segments can be employed in order to easily remove the solidified product 10 from the cooling apparatus, so long as the means does not involve any vertical movement (operation) that may be hazardous.

Adjustment of the casting gap can be made, for example, by replacing the outer cylinders with one that are of a different diameter according to necessity. In this respect, other methods such as using inner cylinder of different diameters, etc. can be also be applied.

The following describes embodiments carried out in accordance with the apparatus thus designed.

EMBODIMENT 1

Zirconia-alumina, titania and yttrium oxide (yttria) or rare earth oxides containing yttria were melted in an arc fusion furnace. The melt was then cooled by using the cooling apparatus provided by the present invention. The casting gap 4 was adjusted to be 5 m/m.

As a result, the solidified product from the melt is an aluminous grinding material wherein the rod diameter of zirconia dispersed evenly in the solidified product form the melt is 2,000–10,000 angstrom (3,000–6,000 Å in average).

The yield content of the foregoing zirconia of the phase tetragonal system was as high as 80% in value. The aluminous abrasive thus obtained was easily processed for coarse crushing by using an impeller breaker and a jaw crusher, and then ground repeatedly using a roll. Thus, a #8 abrasive grain was obtained. The porosity of the abrasive grain obtained was improved to 4% from 6% shown in the abrasive grain obtained by the conventional system. Furthermore, the single grain collapsing strength was also improved to 170 kg compared to 150 kg resulting from use of the conventional system. A yield of #8–#24 abrasive grains obtained by repeated grinding of the solidified product from the melt by the roll showed a remarkably high value of about 80% in comparision with 55% yielded by the conventional process.

EMBODIMENT 2

Zircon and alumina were melted in an arc fusion furnace, and cooled in the gap 4 of the cooling apparatus of the present invention. The gap 4 was adjusted to 10 m/m.

As a result, a zirconia-mullite refractory material containing homogeneously dispersed zirconia with a rod diameter of 2,000–20,000 angstrom (5,000–10,000 Å in average) was obtained. The zirconia-mullite refractory material obtained showed a noticeably low value of $3-5\times10^{-8}/°C$. at 1000° C. in coefficient of thermal expansion.

As should be apparent from the description given above, according to this invention, the molten oxide is quench-hardened after being poured into the casting gap between a pair of curved inner and outer cooling surfaces which face each other. Such a cooling structure and system contribute facilitation of appropriate control of the cooling rate, proper selection of the cooling method, as well as detachment and grinding of the solidified product from the melt, thereby satisfying the most important requisites for this type of means.

We claim:

1. A method for cooling molten oxide comprising the steps of pouring the molten oxides of grinding material or fire resistant material into a gap formed between a pair of curved inner and outer cooling surfaces which face each other positioned coaxially and cooling said molten oxides in radial directions from an imaginary center point to solidify said molten oxide.

2. A cooling apparatus for molten oxides comprising an inner cylinder and an outer cylinder which are disposed coaxially with a casting gap interposed in between, said inner cylinder being rotatable and including a cooling water passage inside, said outer cylinder including two segments which can be separated into right and left sides for opening and closing the outer cylinder.

* * * * *